US012372989B2

(12) United States Patent
Hoffmann et al.

(10) Patent No.: US 12,372,989 B2
(45) Date of Patent: Jul. 29, 2025

(54) BALING APPARATUS

(71) Applicant: AGCO International GmbH, Neuhausen (CH)

(72) Inventors: Steffen Hoffmann, Wolfenbuttel (DE); Malte Cornelius Schlichting, Wolfenbuttel (DE)

(73) Assignee: AGCO International GmbH, Neuhausen (CH)

( * ) Notice: Subject to any disclaimer, the term of this patent is extended or adjusted under 35 U.S.C. 154(b) by 348 days.

(21) Appl. No.: 17/930,773

(22) Filed: Sep. 9, 2022

(65) Prior Publication Data

US 2023/0115928 A1    Apr. 13, 2023

(30) Foreign Application Priority Data

Oct. 13, 2021  (GB) ...................................... 2114623

(51) Int. Cl.
G05D 13/66 (2006.01)
A01F 15/08 (2006.01)

(52) U.S. Cl.
CPC ........... *G05D 13/66* (2013.01); *A01F 15/085* (2013.01)

(58) Field of Classification Search
CPC ......... A01B 67/00; A01D 89/00; A01F 15/07; A01F 15/08; A01F 15/0825; A01F 15/0833; A01F 15/085; A01F 15/106; B60W 30/14; G05D 13/66
See application file for complete search history.

(56) References Cited

U.S. PATENT DOCUMENTS 8,972,123 B2 * 3/2015 Smith ..................... F16H 61/70
475/198
2002/0108508 A1 8/2002 Leupe et al.
(Continued)

FOREIGN PATENT DOCUMENTS

EP   2936969 A1 * 10/2015 ............. A01D 69/00
GB   2362127 A  * 11/2001 ............. A01F 15/00
(Continued)

OTHER PUBLICATIONS

English translation of EP 2936969 A1 (Year: 2015).*
UK Intellectual Property Office, Search report for related UK Application No. GB2114623.8, dated Jul. 1, 2022.

*Primary Examiner* — Hitesh Patel
*Assistant Examiner* — Elle Rose Knudson

(57) ABSTRACT

A method of controlling a tractor/baler combination includes advancing a tractor/baler combination through a swath or windrow of a harvested crop material with a tractor PTO operating at a constant speed to power a drive of a baling chamber of the baler and the baler operating to pick up harvested crop material; assessing the flowrate of the harvested crop material in the baler and the torque of the baling chamber drive; comparing the flowrate with an optimal flowrate and the torque of the baling chamber drive with an optimal baling chamber drive; and, if the assessed flowrate differs from the optimal flowrate or the assessed torque of the baling chamber drive differs from the optimal torque by more than a predetermined amount, changing the speed of advancement of the tractor/baler combination, and changing the flowrate in the baler and the torque of the baling chamber drive.

5 Claims, 5 Drawing Sheets

(56) References Cited

U.S. PATENT DOCUMENTS

| | | | | |
|---|---|---|---|---|
| 2008/0015759 A1* | 1/2008 | Byttebier | ............... | F16H 61/46 |
| | | | | 477/46 |
| 2011/0060507 A1 | 3/2011 | Vanhercke et al. | | |
| 2014/0261023 A1 | 9/2014 | Smith et al. | | |
| 2015/0379785 A1* | 12/2015 | Brown, Jr. | .............. | A01F 15/08 |
| | | | | 701/29.1 |
| 2022/0063617 A1 | 3/2022 | Good et al. | | |

FOREIGN PATENT DOCUMENTS

| | | | |
|---|---|---|---|
| GB | 2362127 A1 | | 11/2001 |
| NL | 2011682 C2 | * | 4/2015 |

* cited by examiner

BALING APPARATUS

FIELD OF THE INVENTION

The present invention relates to a baling apparatus and in particular to a monitoring and/or a control system for a baling apparatus.

BACKGROUND

Round balers are well known in the art. Such balers pick up a harvested crop from a swath or windrow and feed the harvested crop into a baling chamber where it is formed into a cylindrical bale.

The harvested crop is drawn into the baler by a driven pickup apparatus and directed to a baling chamber. The baling chamber includes drive means such as rollers in order to form a bale within the baling chamber. These drive means are conveniently driven from the Power Take Off (PTO) of a tractor towing the baler. It is known, for example from EP 3 062 600 to provide a split drive from the PTO to each of the feeding side (pickup) and forming side (baling chamber) drive means. The load on each of these drives will be dependent upon the flow rate of harvested crop being processed by each of the feeding side and forming side drives. The flow rate of harvested crop can be increased by increasing the speed of the tractor towing the baler over the swath or windrow and decreased by decreasing the speed of the tractor. The flow rate is also affected by the density of the harvested crop in the swath or windrow such that an operator may wish to increase the speed of the tractor when approaching a swath or windrow of low density in order to maintain an even flow rate of harvested crop to the baling chamber or decrease the speed of the tractor in order to avoid overloading when processing a swath or windrow of high density.

Round balers are usually fitted with an overload device that limits the maximum power that can be processed by the baler drive means. It is usually up to the experience of an operator to understand if the operator is very close to the maximum or if the operator could go quicker or should reduce speed.

It is an advantage of the present invention that these problems are addressed, in particular by allowing an operator to make better decisions regarding a potentially imminent overload situation.

SUMMARY OF THE INVENTION

According to a first aspect of the present invention, a method of controlling a tractor/baler combination comprises the steps of:
(i) advancing a tractor/baler combination through a swath or windrow of harvested crop material with a tractor PTO operating at a generally constant speed to power a drive of a baling chamber of the baler and the baler operating to pick up harvested crop material;
(ii) during step (i) assessing the flowrate of harvested crop material in the baler and the torque of the baling chamber drive
(iii) comparing the assessed flowrate with an optimal flowrate and the torque of the baler chamber drive with an optimal baler chamber drive; and
(iv) if the assessed flowrate differs from the optimal flowrate by more than a predetermined amount or the assessed torque of the baler chamber drive differs from the optimal torque by more than a predetermined amount, changing the speed of advancement of the tractor/baler combination, and hence changing the flowrate of biological matter in the baler and the torque of the baler chamber drive.

Preferably the flowrate of harvested crop material is determined by measuring a torque of a drive shaft driving a pick up unit of the baler.

Preferably the step of changing the speed of advancement of the tractor/baler combination comprises signalling to an operator that the speed of advancement of the tractor/baler combination should be changed. Alternatively, the step of changing the speed of advancement of the tractor/baler combination comprises signalling to an engine management system of the tractor that the speed of advancement of the tractor should be changed.

According to a second aspect of the invention, the method of the first aspect of the invention is controlled by a processor operatively connected to receive and process signals indicative of the flowrate of harvested crop material in the baler, the torque of the baling chamber drive, and the tractor/baler speed.

According to a third aspect of the present invention a tractor/baler combination includes a processor operatively connected to sensors detecting the flowrate of harvested crop material in the baler, the torque of the baling chamber drive and the tractor/baler speed and programmed to carry out a method according to either the first or second aspects of the invention in accordance with the output of these sensors.

BRIEF DESCRIPTION OF THE DRAWINGS

The invention will now be described, by way of example only, with reference to the accompanying drawings, in which.

DETAILED DESCRIPTION OF SPECIFIC EMBODIMENTS OF THE INVENTION

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Figure 1:
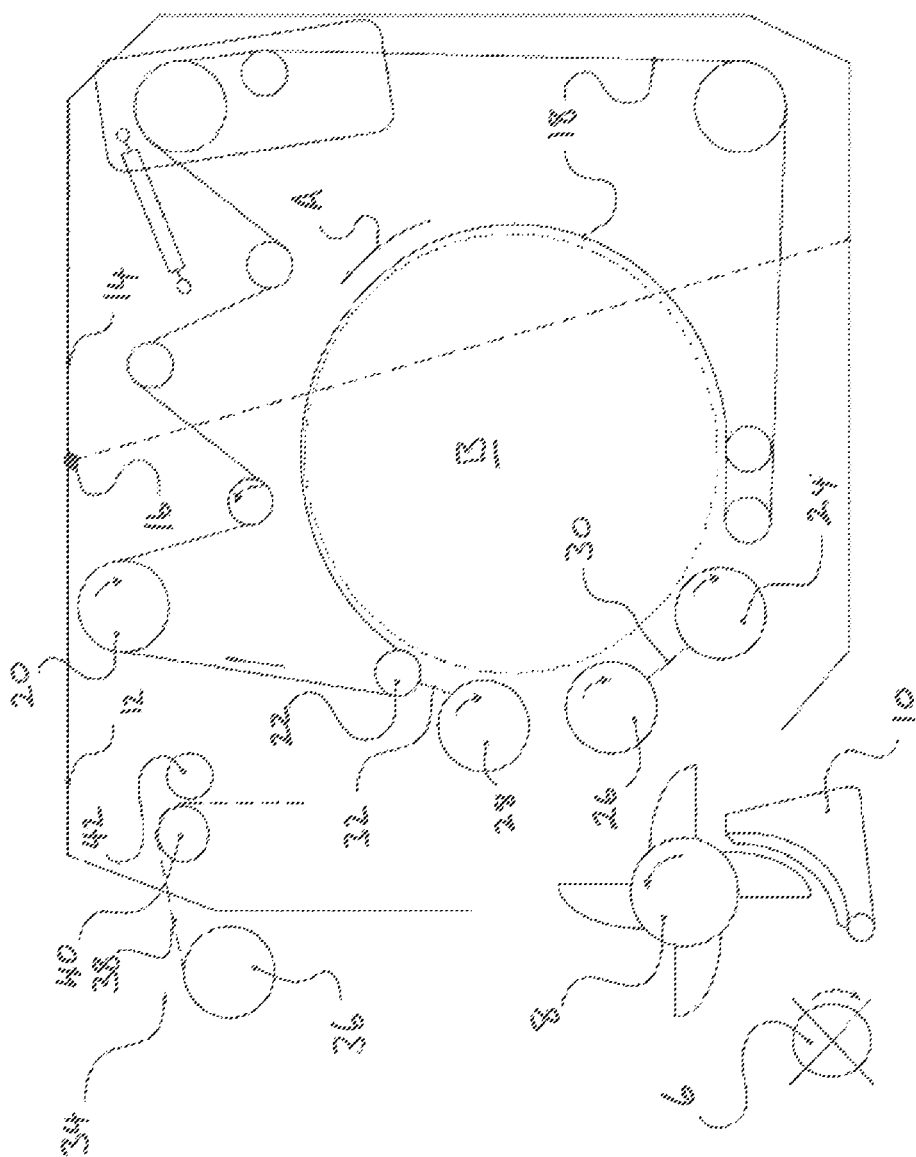
FIG. 1 shows a schematic side view of a round baler for use with the present invention.
Figure 3:
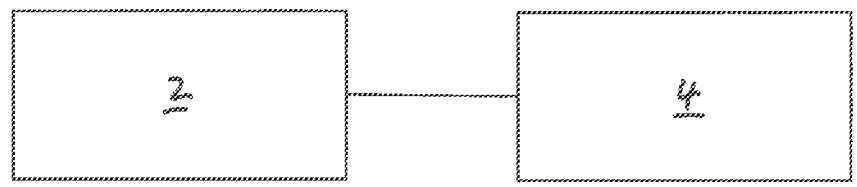
FIG. 3 shows a schematic arrangement of a tractor and a baler.
Figure 4:
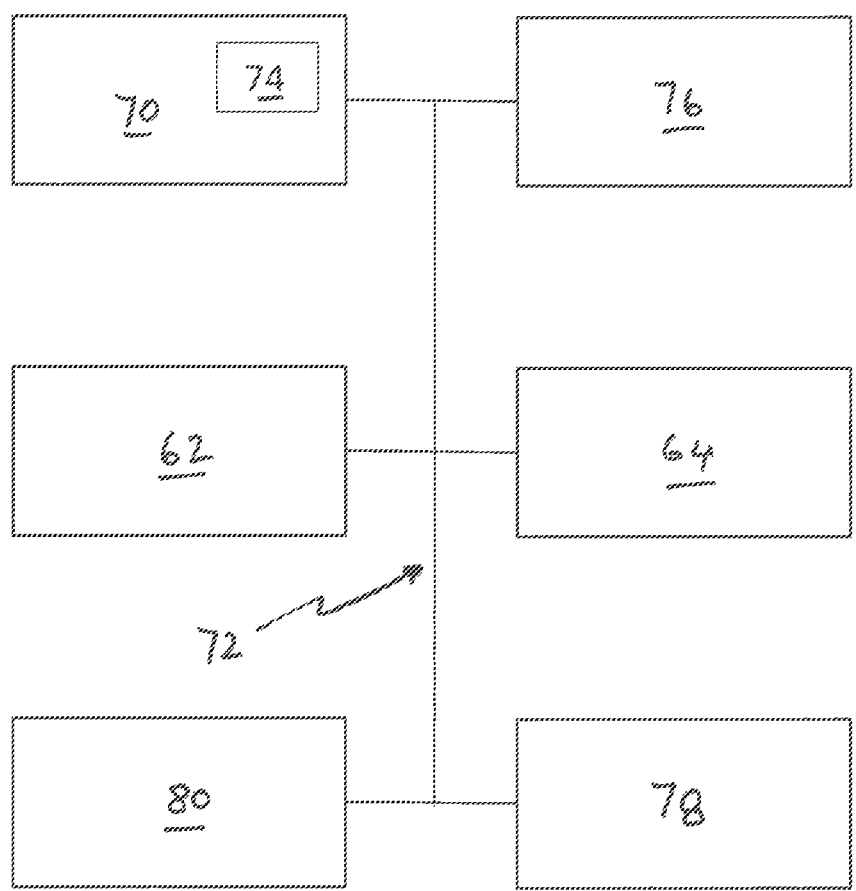
FIG. 4 shows a schematic view of electronic aspects of the present invention.

Referring first to FIG. 1 a baler 2 which creates round bales from a harvested crop is shown. In operation, the baler 2 is towed by an agricultural vehicle, such as a tractor 4, to which the baler is connected (FIG. 3).

A pick up unit 6 picks up harvested crop material from a ground surface while the baler is towed over the ground. The harvested crop material is arranged in a swath or windrow on the ground in order to be picked up by the baler 2.

A conveying rotor 8 is provided to transfer the harvested crop material from the pickup unit 6 to a baling chamber within the baler 2. A cutting assembly 10 may also be provided adjacent the conveying rotor 8.

The baler 2 comprises a front housing 12 and a tailgate or discharge gate 14. The tailgate 14 is pivotally mounted to the front housing 12 about a pivot axis 16.

In the illustrated embodiment, the baling chamber is a variable diameter chamber. The baling chamber is defined by a number of parallel pressing belts 18 arranged around a number of rollers including driven rollers 20 and idler rollers 22. The baling chamber also includes three further pressing rollers 24,26,28. The first and second pressing rollers define an inlet 30 through which the harvested crop material is introduced into the baling chamber. A wrapping material inlet 32 is defined between the third pressing roller 28 and an adjacent idler roller 22.

As harvested crop material is introduced into the baling chamber, rotation of the harvested crop material in the direction of arrow A causes a bale B to be formed within the baling chamber.

The baler 2 also includes a wrapping apparatus 34. In the illustrated embodiment the wrapping apparatus 34 is mounted on the front housing 12 of the baler 2. The wrapping apparatus 34 includes a reservoir in which a reel 36 of wrapping material 38 may be stored. The wrapping material may comprise any suitable material. Suitable wrapping materials include netwrap or film. A leading edge of the wrapping material 38 is drawn from the reel 36 by a pair of dispensing rollers 40, 42 before being introduced into the baling chamber by way of the wrapping material inlet 32.

When a bale of suitable size has been formed, the wrapping apparatus 34 is actuated and several layers of the wrapping material 38 are placed around the rotating bale B. The wrapping material 38 is then severed by a suitable mechanism (not shown). The tailgate 14 is then displaced by any suitable mechanism in order to allow the wrapped bale to be ejected from the bale forming chamber.

Figure 2:
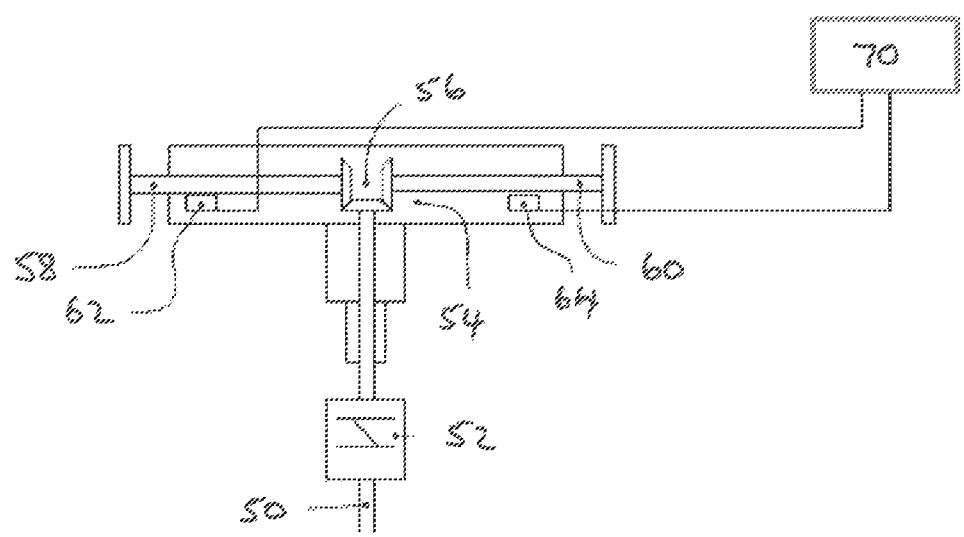
FIG. 2 shows a schematic view of a drive arrangement for use with the present invention.

FIG. 2 shows schematically an example drive arrangement of the baler. The PTO shaft 78 of the tractor drives an input shaft 50 of the baler 2. An overload clutch 52 is arranged in the input shaft 50 of the baler 2. In the event of an overload situation, the overload clutch 52 interrupts the input shaft 50 and disconnects the powertrain leading from the tractor motor to the rotating parts of the baler 2. It will be appreciated that such an overload situation is undesirable. It is an advantage of the present invention that operation of the overload clutch 52 is sought to be avoided.

The input shaft 50 ends in a transmission assembly 54. In the illustrated embodiment, the transmission assembly 54 drives a feeding side output shaft 58 and a forming side output shaft 60. Both shafts start in the transmission assembly. In the illustrated embodiment, the transmission assembly includes a bevel gear 56. The transmission ratio between the input shaft 50 and the feeding side output shaft 58 may differ from the transmission ratio of the input shaft 50 and the forming side output shaft 60 by adapting the bevel gear 56.

In the illustrated embodiment, the feeding side output shaft 58 drives the pickup unit 6 and the conveying rotor 8, while the forming side output shaft 60 drives the pressing rollers 24,26,28, the driven guiding roller 20 and the driven pulling roller 40.

A feeding side torque sensor 62 and a forming side torque sensor 64 are arranged within the transmission assembly 54 and provide signals to a control unit 70. The control unit 70 also provides signals to control operation of the baler and operation of the tractor 4. Conveniently the signals are provided by way of a suitable data communication network 72 such as one compliant with the ISOBUS standard (a network in conformance to the ISO 11783).

An operator may send signals to the control unit 70 by use of a user terminal 76. The user terminal is conveniently located within the operator's cab of the tractor 4. The user terminal 76 may include a keypad and/or a touch screen for communication by the operator with the control unit 70. The control unit 70 may also send signals to the user terminal 76 to provide information to the operator regarding operation of the tractor 4 and the baler 2. The user terminal 76 may include a display screen and, optionally speakers, for communication by the control unit 70 with the operator.

The control unit 70 may conveniently comprise a single processor located on the tractor 4 or its functions may be split between a first processor located on the tractor 4 and one or more additional processors located on the baler 2, the additional processor(s) being in electronic communication with the first processor.

The control unit 70 is also able to access a suitable memory 74. The memory 74 may take any suitable form and is in electronic communication with the control unit 70. The memory 74 is adapted to store, in any suitable manner such as a database or look up table, values for the maximum recommended or optimal torque for the feeding output shaft 58 and the maximum recommended or optimal torque for the forming output shaft 60.

The optimal torque values can be set according to a bale cycle status of the baler 2 since the expected torque value on the forming output shaft 60 will be greater the larger the forming bale in the baling chamber.

Figure 5:
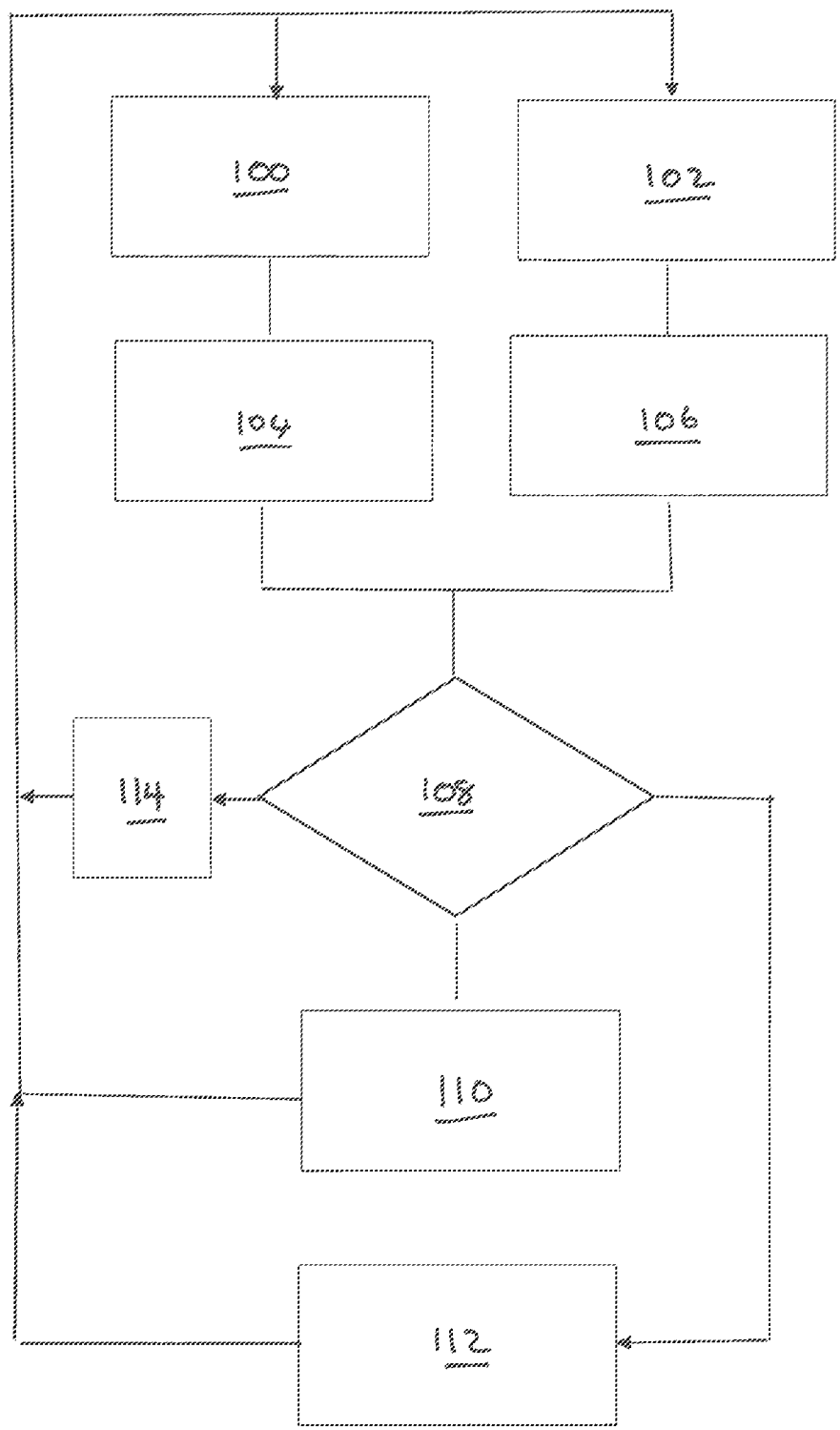
FIG. 5 shows a flow diagram illustrating the stages of operation of a baler in accordance with a first mode of operation of the present invention.

In a first method of the present invention, signals from each of the feeding side torque sensor 62 (step 100 FIG. 5), and a forming side torque sensor 64 are sent to the control unit 70 (step 102).

The control unit 70 then interrogates the memory unit 74 to determine the maximum recommended or optimal torque for the feeding output shaft 58 (step 104) and the maximum recommended or optimal torque for the forming output shaft 60 (step 106).

The control unit 70 then determines whether both of the feeding output shaft torque and the forming output shaft torque are below a predetermined tolerance value of their respective optimal torque values, whether one of the feeding output shaft torque and the forming output shaft torque are within a predetermined tolerance value of their respective optimal torque values or whether one of the feeding output shaft torque and the forming output shaft torque are above their respective optimal torque values (step 108).

If both of the feeding output shaft torque and the forming output shaft torque are below a predetermined tolerance value of their respective optimal torque values, the control unit 70 will send a signal to the user terminal 76 to communicate to the operator that the speed of the tractor 4 may be safely increased (step 110).

If one of the feeding output shaft torque and the forming output shaft torque are within a predetermined tolerance value of their respective optimal torque values, the control unit 70 will send a signal to the user terminal 76 to communicate to the operator that the speed of the tractor 4 may be maintained (step 112).

If one of the feeding output shaft torque and the forming output shaft torque exceeds their respective optimal torque values, the control unit 70 will send a signal to the user terminal 76 to communicate to the operator that the speed of the tractor 4 should be decreased as soon as possible in order to avoid an overload situation (step 114).

Figure 6:
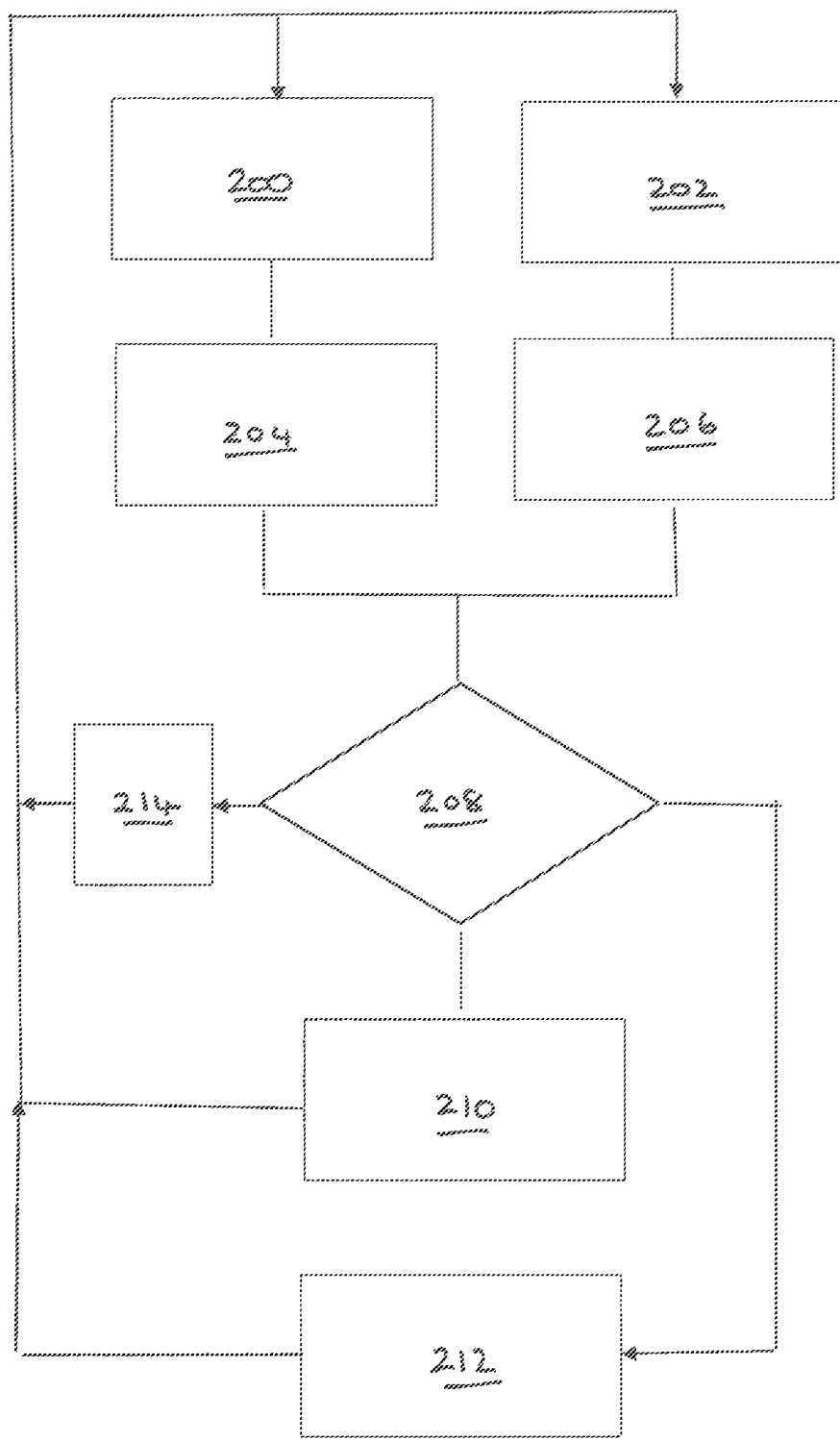
FIG. 6 shows a flow diagram illustrating the stages of an alternative mode of operation of the present invention.

In a second method of the present invention, as in the first method, signals from each of the feeding side torque sensor 62 (step 200 FIG. 6) and a forming side torque sensor 64 are sent to the control unit 70 (step 202).

The control unit 70 again then interrogates the memory unit 74 to determine the optimal torque for the feeding output shaft 58 (step 204) and the optimal torque for the forming output shaft 60 (step 206).

The control unit 70 then, again as in the first method, determines whether both of the feeding output shaft torque and the forming output shaft torque are below a predetermined tolerance value of their respective optimal torque values, whether one of the feeding output shaft torque and the forming output shaft torque are within a predetermined tolerance value of their respective optimal torque values or whether one of the feeding output shaft torque and the forming output shaft torque are above their respective optimal torque values (step 208).

If both of the feeding output shaft torque and the forming output shaft torque are below a predetermined tolerance value of their respective optimal torque values, the control unit 70 will send a signal to the engine management system 80 of the tractor 4 to increase the speed of the tractor 4 and a signal to the user terminal 76 to communicate to the operator that the speed of the tractor 4 has been increased and, optionally a signal to the user terminal 76 to communicate to the operator the feeding output shaft torque and the forming output shaft torque detected and/or how far below the predetermined tolerance value of their respective optimal torque values the feeding output shaft torque and the forming output shaft torque detected are (step 210).

If one of the feeding output shaft torque and the forming output shaft torque are within a predetermined tolerance value of their respective optimal torque values, the control unit 70 will send a signal to the engine management system 80 of the tractor 4 to maintain the speed of the tractor 4 and a signal to the user terminal 76 to communicate to the operator that the speed of the tractor 4 has not been changed, and optionally a signal to the user terminal 76 to communicate to the operator the feeding output shaft torque and the forming output shaft torque detected and/or that one of the feeding output shaft torque and the forming output shaft torque are within a predetermined tolerance value of their respective optimal torque values, for example by sounding a warning signal or causing at least a portion of the display of the user terminal 76 to change colour (step 212).

If one of the feeding output shaft torque and the forming output shaft torque exceeds their respective optimal torque values, the control unit 70 will send a signal to the engine management system 80 of the tractor 4 to decrease the speed of the tractor 4 and send a signal to the user terminal 76 to communicate to the operator that the speed of the tractor 4 has been decreased in order to avoid an overload situation (step 214).

From reading the present disclosure, other modifications will be apparent to persons skilled in the art. Such modifications may involve other features which are already known in the field of balers and component parts therefore and which may be used instead of or in addition to features already described herein.

The invention claimed is:

1. A method of controlling a tractor/baler combination comprising:
advancing a tractor and baler combination through a swath or windrow of a harvested crop material with a tractor Power Take Off operating at a generally constant speed to power a drive of a baling chamber of a baler of the tractor and baler combination and the baler operating to pick up the harvested crop material;
while advancing the tractor/baler combination through the swath or windrow of the harvested crop material:
assessing a first torque of a feeding output shaft of the baling chamber drive; and
assessing a second torque of a forming output shaft of the baling chamber drive;
comparing the assessed first torque with an optimal first torque of the feeding output shaft of the baling chamber drive and the assessed second torque with an optimal second torque of the forming output shaft of the baling chamber drive; and
responsive to both the assessed first torque differing from the optimal first torque of the feeding output shaft of the baling chamber drive by more than a first predetermined torque amount and the assessed second torque differing from the optimal second torque of the forming output shaft of the baling chamber drive, respectively, by more than a second predetermined torque amount, changing a speed of advancement of the tractor and baler combination, and changing one or more of the first torque and the second torque.

2. The method of claim 1, wherein changing the speed of advancement of the tractor and baler combination comprises signaling to an operator that the speed of advancement of the tractor and baler combination should be changed.

3. The method of claim 1, wherein changing the speed of advancement of the tractor and baler combination comprises signaling to an engine management system of the tractor that the speed of advancement of the tractor and baler combination should be changed.

4. The method according to claim 1, further comprising outputting signals indicative of the assessed first torque, the assessed second torque, and the tractor and baler combination speed.

5. A tractor and baler combination comprising:
a tractor;
a baler; and
a control unit comprising:
at least one processor; and
at least one non-transitory computer-readable storage medium storing instructions thereon that, when executed by the at least one processor, cause the control unit to:
advancing a tractor and baler combination through a swath or windrow of a harvested crop material with a tractor Power Take Off operating at a generally constant speed to power a drive of a baling chamber of a baler of the tractor and baler combination and the baler operating to pick up the harvested crop material;
while advancing the tractor/baler combination through the swath or windrow of the harvested crop material:
assessing a first torque of a feeding output shaft of the baling chamber drive; and
assessing a second torque of a forming output shaft of the baling chamber drive;
comparing the assessed first torque with an optimal first torque of the feeding output shaft of the baling chamber drive and the assessed second torque with an optimal second torque of the forming output shaft of the baling chamber drive; and
responsive to both the assessed first torque differing from the optimal first torque of the feeding output shaft of the baling chamber drive by more than a first predetermined torque amount and the assessed second torque differing from the optimal second torque of the forming output shaft of the baling chamber drive, respectively, by more than a second predetermined torque amount, changing a speed of advancement of the tractor and baler combination, and changing one or more of the first torque and the second torque.

* * * * *